R. COWAN.

Combined Corn-Planter and Seeders.

No. 134,855.  Patented Jan. 14, 1873.

WITNESSES.  INVENTOR.

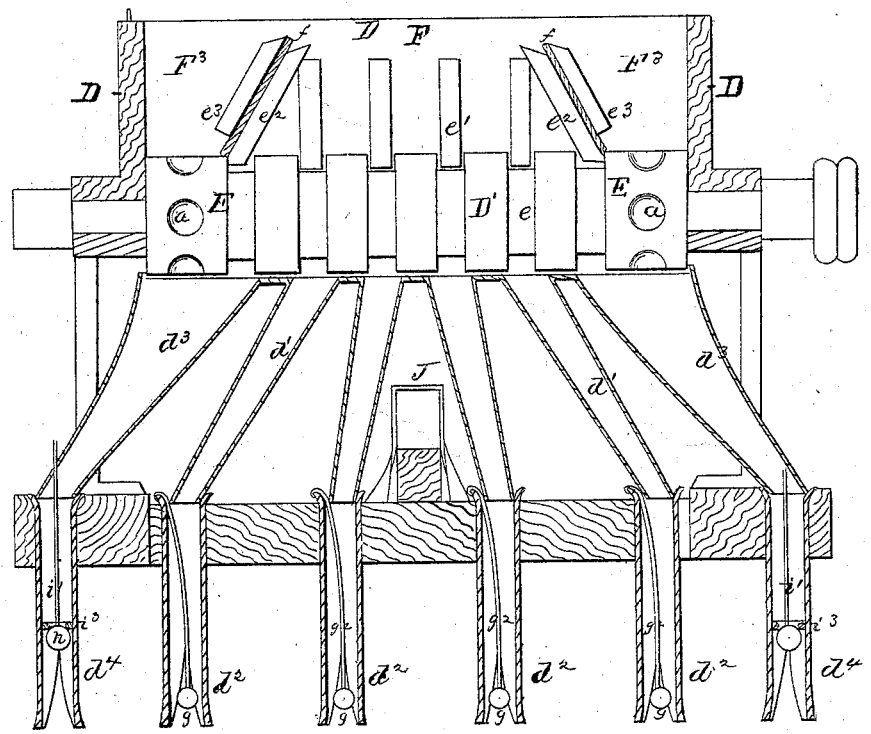

UNITED STATES PATENT OFFICE.

ROBERT COWAN, OF BLOOMFIELD, ILLINOIS.

IMPROVEMENT IN COMBINED CORN-PLANTERS AND SEEDERS.

Specification forming part of Letters Patent No. 134,855, dated January 14, 1873.

*To all whom it may concern:*

Be it known that I, ROBERT COWAN, Sr., of Bloomfield, in the county of Edgar and State of Illinois, have invented a new and valuable Improvement in Corn-Planter and Seed-Drill; and I do hereby declare that the following is a full, clear, and exact description of the construction and operation of the same, reference being had to the annexed drawing making a part of this specification, and to the letters and figures of reference marked thereon.

Figure 1:
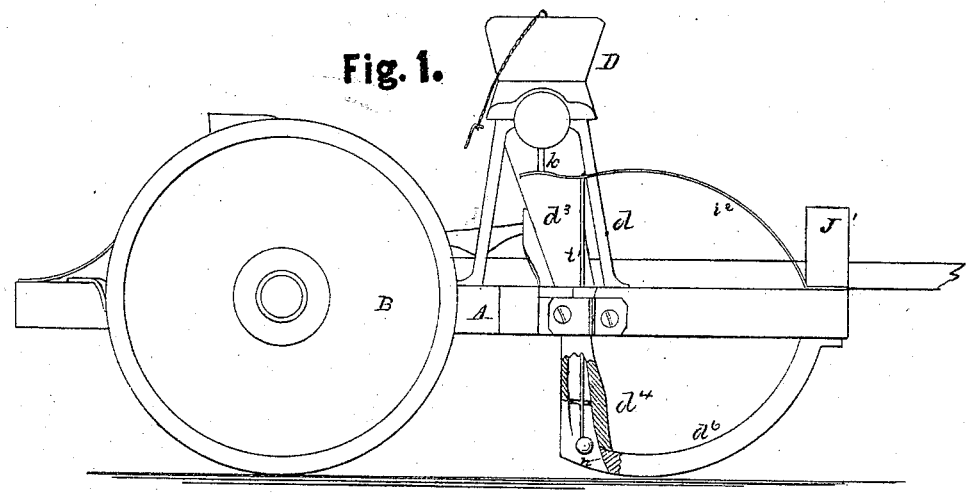
Figure 2:
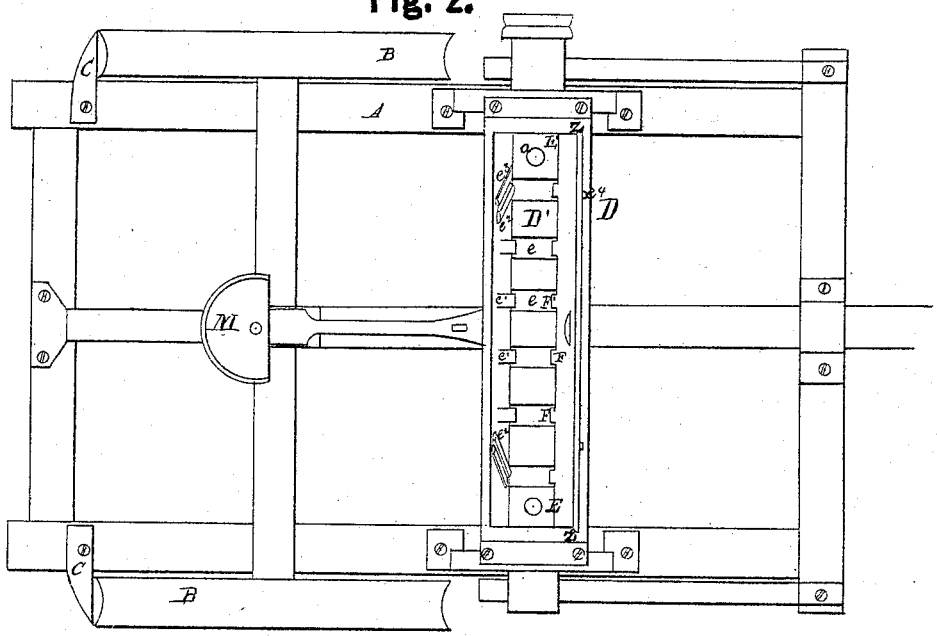

Figure 1 of the drawing is a representation of a side elevation of my invention, showing section of dropping-tube. Fig. 2 is a plan view of my invention. Fig. 3 is a transverse section of the same.

This invention has relation to corn-planters and seed-drills; and the novelty consists in the novel construction of a seed-hopper with end grooves and oblique guides, as hereinafter described and claimed, so arranged as to receive interchangeably devices for planting or for sowing broad-cast at will.

Referring to the accompanying drawing, A designates the frame of the implement, supported at the rear ends upon the large wheels B B, which roll the ground after the corn has been dropped, and which have their peripheries grooved in a concave manner so as to shape the ground into ridges. Scrapers C, secured to the frame, are used to clean said wheels as they revolve. D designates the seed-hopper, supported above the frame A by means of the standard $d$, and provided with the seeding-cylinder D'. To the bottom part of the hopper, and underneath the cylinder, are attached the flexible seed-spouts $d^1$ $d^3$, communicating with the vertical drill-tubes $d^2$ $d^4$, which are arranged in a transverse row and secured rigidly to the frame A. The cylinder is adapted to use in planting corn in hills, or in sowing seed in drills or furrows. To render the cylinder available in planting corn a number of cups, $a$, are formed near each end to convey the corn in proper quantities to the tubes $d^3$, through which it is conducted to the tubes $d^4$, and thence deposited in the earth. Between the shoulders E in which said cups are formed the cylinder has grooves cut around it, as shown at $e$, to allow the seed to pass to the spouts $d^1$, through which it is conducted to the drill-tubes $d^2$. The seed passes forward of the cylinder. Cleats $e^1$ $e^2$, secured to the back part of the hopper, extend into the grooves $e$ and prevent the seed from falling behind the cylinder. A slide, F, having studs F' projecting from its lower edge, fits grooves $z$ at the ends of the hopper, and is used to shut off the flow of seed forward of the cylinder, the studs F' entering the grooves $e$ when the slide is inserted in the front part of the hopper. This slide prevents the escape of corn through the grooves $e$, but does not hinder its passage at the ends of the cylinder. To prevent seed from escaping at the ends of the cylinder when the implement is in use as a drill, small slides $f$ are put down between the front and back part of the hopper, and held in place by means of the cleats or guides $e^2$ $e^3$ and the grooves $e^4$. These slides produce corn-boxes F$^3$ at the ends of the hopper. Within each of the drill-tubes $d^2$ is arranged a ball or disk, $g$, suspended by a rod, $g^2$, and designed for the purpose of scattering the seed as it falls through the tube. The back parts of the tubes $d^2$ $d^4$ are open to prevent the seed from accumulating or the tubes from becoming clogged with earth. From the tubes to the forward part of the frame runners $d^6$ extend, and are used to open the ground and clear the way for the sowing of the corn or seed. The tubes $d^2$ $d^4$ fit within concave recesses of the frame, and are secured thereto by means of plates, which may be taken off when it is desired to remove the seed-tube to better adapt the implement to the planting of corn, or when it is desired to remove the tubes $d^4$, so that the implement may be more convenient for sowing seed. Within the tubes $d^4$ are arranged ball-valves $h$ suspended from springs $i^2$ by rods $i^1$. The springs $i^2$ raise these valves against the flanges $i^3$ and close the tubes.

As the cylinder turns studs $k$, projecting from the shaft thereof, come in contact with said springs, depressing them, and at the same time opening the tubes and allowing the corn to drop. The action of these valves is such as to cause the corn to fall at the proper intervals for planting in hills.

These tubes $d^3$ and $d^4$ can be used in broadcast sowing by suspending the ball-valves as shown in the tubes $d^2$ in Fig. 3.

What I claim as new is—

The seed-hopper D, constructed with end grooves Z and oblique guides, as described, to receive the slides F and $f$ interchangeably, substantially as and for the purpose specified.

In testimony that I claim the above I have hereunto subscribed my name in the presence of two witnesses.

ROBERT COWAN.

Witnesses:
　WM. N. BARKLEY,
　JOHN N. SOMMERVILLE.